United States Patent [19]

Milone

[11] Patent Number: 4,961,373
[45] Date of Patent: Oct. 9, 1990

[54] TREATMENT SYSTEM

[75] Inventor: Philip G. Milone, Burlington, Mass.

[73] Assignee: Wolverine Corporation, Merrimac, Mass.

[21] Appl. No.: 243,905

[22] Filed: Sep. 13, 1988

[51] Int. Cl.$^5$ .......................... A23L 3/36; A23L 1/31
[52] U.S. Cl. ...................................... 99/355; 99/357; 99/443 C; 99/470; 99/477; 99/517; 99/535
[58] Field of Search .................................. 99/477–479, 99/386, 443 C, 420, 427, 448, 446, 419, 443 R, 473, 470, 474, 355–357, 517, 535; 432/37, 47, 144, 145; 34/46, 216, 217

[56] References Cited

U.S. PATENT DOCUMENTS

| | | | |
|---|---|---|---|
| 1,715,625 | 6/1929 | Rind | 99/477 |
| 1,832,854 | 11/1931 | Blier . | |
| 2,244,670 | 6/1941 | Benedict . | |
| 2,596,381 | 5/1952 | Doty | 99/477 |
| 2,839,409 | 6/1958 | Matlen | 99/420 |
| 3,003,409 | 10/1961 | Mills | 99/420 |
| 3,125,017 | 3/1964 | Tauber . | |
| 3,191,222 | 6/1965 | Townsend . | |
| 3,262,217 | 7/1966 | Brown . | |
| 3,295,434 | 1/1967 | Wilhelm et al. | 99/427 |
| 3,518,934 | 7/1970 | Davis et al. | 99/443 C |
| 3,694,853 | 10/1972 | Greider | 17/33 |
| 3,718,082 | 2/1973 | Lipoma | 99/477 |
| 3,736,860 | 6/1973 | Vischer et al. | 99/443 C |
| 3,877,361 | 4/1975 | Trainor et al. | 99/478 |
| 3,881,403 | 5/1975 | Ingram et al. | 99/443 C |
| 3,908,533 | 9/1975 | Fagerstrom | 99/386 |
| 4,121,509 | 10/1978 | Baker | 99/386 |
| 4,154,861 | 5/1979 | Smith | 99/478 |
| 4,401,018 | 8/1983 | Berry | 99/339 |
| 4,440,071 | 4/1984 | Boosalis | 99/443 C |
| 4,569,658 | 2/1986 | Wiggins et al. | 432/47 |
| 4,754,558 | 7/1988 | Milone | 99/401 |

FOREIGN PATENT DOCUMENTS 1017896  10/1957  Fed. Rep. of Germany ........ 99/477

Primary Examiner—Timothy F. Simone
Attorney, Agent, or Firm—Fish & Richardson

[57] ABSTRACT

A system for thermally processing a strand of link food products includes structure defining an elongated treatment zone, and hook type conveyor structure for supporting a strand of encased food product links to be thermally treated in a series of depending loops. Each depending loop containing a plurality of links, for movement along a transport path through the treatment zone. The treatment zone is defined by parallel spaced pressure plenum structures, each pressure plenum structure having a vertical side wall and the hook type conveyor structure being disposed between the side walls. Each side wall has an array of generally horizontally extending nozzle tubes that are in communication with its corresponding pressure plenum structure. Conditioning plenum structure coupled to the pressure plenum structures includes heater means for heating gas and blower means for flowing gas from the conditioning plenum structure to the pressure plenum structures for flow with substantial velocity through said nozzle tubes in opposed arrays of streams for impact on loops of link food products supported on the conveyor.

Exhaust duct structure coupled to the treatment zone flows gas from the treatment zone to the conditioning plenum.

16 Claims, 3 Drawing Sheets

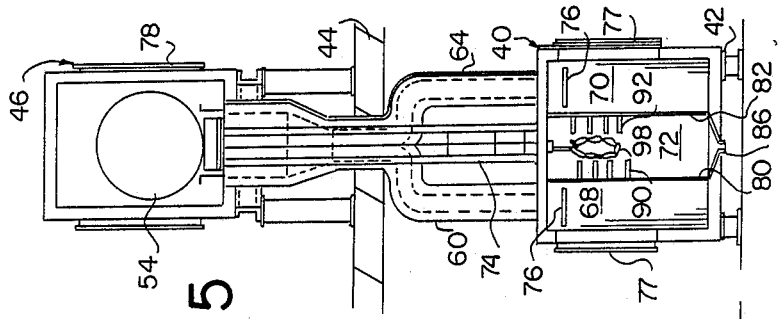
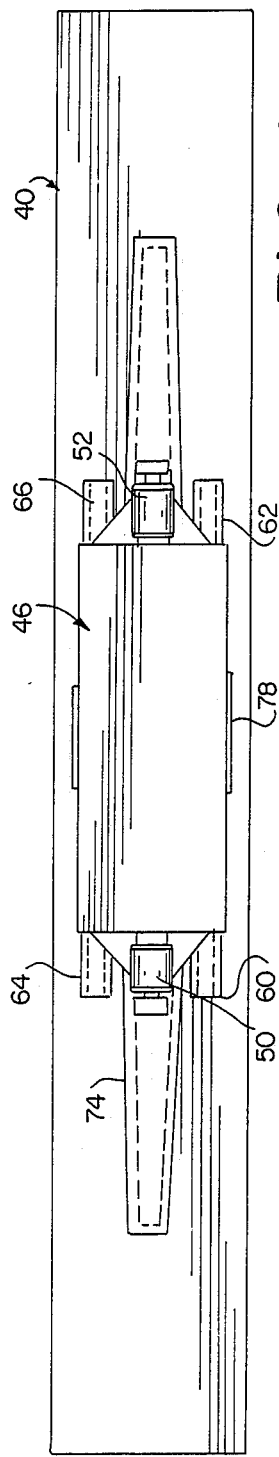
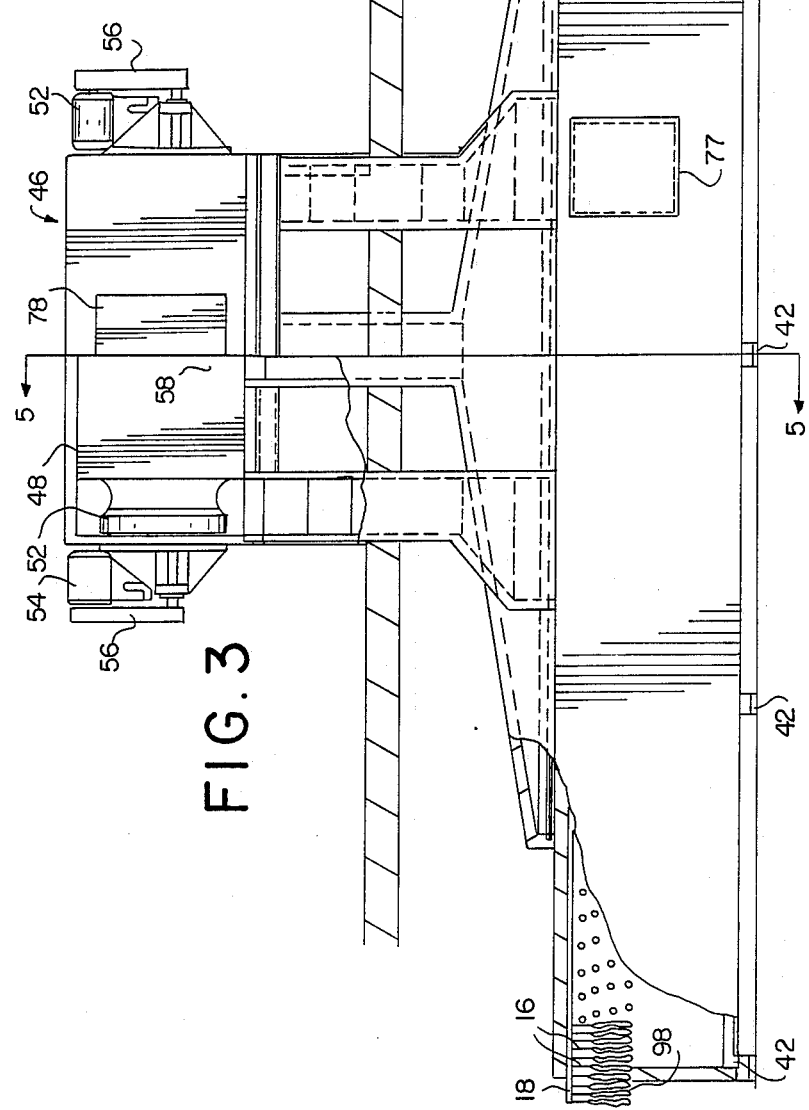

TREATMENT SYSTEM

This invention relates to material treatment systems, and more particularly to systems for thermally processing encased food products.

A conventional method for manufacturing encased food products, such as sausages or frankfurters, includes the steps of preparing an emulsion of meat, spices and curing agents; stuffing the emulsion into a casing strand under pressure and forming a series of links in the strand; and then thermally cooking or otherwise processing (e.g. smoking) the strand of encased food links to destroy or inhibit bacterial growth, to impart flavor and texture, and to produce the desired color development and surface formation. After the encased food links have properly cooked and/or otherwise processed, they are chilled and then peeled and/or packaged for shipping or storage. The thermal processing operation must meet certain regulatory requirements including attaining of a minimum temperature such as 150° F. (American Meat Institute Foundation). In a conventional smoke house, the encased food products are dried and cooked by circulation of low velocity heated gas with strands of linked products supported on smoke sticks. It has also been proposed to transport strands of link products longitudinally through a cooking tunnel with links supported on a conveyor chain or on an open mesh screen as gases are circulated from the input end of the tunnel along the length of a tunnel to an exhaust at the discharge end.

In accordance with one aspect of the invention, there is provided a system for thermally processing a strand of link food products that includes structure defining an elongated treatment zone, and hook type conveyor structure for supporting a strand of encased food product links to be thermally treated in a series of depending loops, each depending loop containing a plurality of links, for movement along a transport path through the treatment zone. The treatment zone is defined by parallel spaced pressure plenum structures, each pressure plenum structure having a vertical side wall and the hook type conveyor structure is disposed between the side walls. Each side wall has an array of generally horizontally extending nozzle tubes that are in communication with its corresponding pressure plenum structure. Conditioning plenum structure coupled to the pressure plenum structures includes heater means for heating gas and blower means for flowing gas from the conditioning plenum structure to the pressure plenum structures for flow with substantial velocity through the nozzle tubes in opposed arrays of streams for impact on loops of link food products supported on the conveyor, and exhaust duct structure is coupled to the treatment zone for flowing gas from the treatment zone for return to the conditioning plenum structure.

In preferred embodiments, the arrays of opposed nozzle tubes are offset from one another so that the link food products are subjected to torquing (twisting) actions by offset flows of gas as the link products are transported through the treatment zone. Preferably, the gas is flowed through the nozzle tubes into the treatment zone at a temperature of at least 300° F. and a velocity of at least about 3,000 feet per minute, and the conveyor structure moves the link products to be processed through the treatment zone in less than ten minutes with the link products achieving an internal temperature of at least 150° F. at the exit of the treatment zone.

Factors such as the number of tubes, the height and length of the treatment zone, and the conveyor speed may be varied as a function of the size of the link food products and the number of links in the loops. Shorter treatment zones may be employed with longer loops, for example. In preferred embodiments, the total orifice area of the nozzle tubes is less than five percent of the area of the side walls of the treatment zone; baffle structure in each pressure plenum structure provides substantially uniform pressure throughout the length of each pressure plenum; each tube has a length of less than twenty-five centimeters; the tips of the tubes of one array are spaced less than one-half meter from the tips of the tubes of the other array; and each array has at least three rows of tubes and each row of tubes contains at least twenty tubes.

In a particular embodiment, each tube is cylindrical and has an outlet orifice of about three centimeters diameter; the total orifice area of the nozzle tubes is about 2.7 percent of the area of the side walls of the treatment zone; each tube has a length of about fifteen centimeters; the tips of the tubes of one array are spaced about one-third meter from the tips of the tubes of the other array; and each array has four rows of tubes and each row of tubes contains about one hundred tubes.

In accordance with another aspect of the invention, there is provided a method of thermally processing link food products comprising the steps of disposing an elongated strand of link food products on a hook type conveyor in successive depending loops with a plurality of links in each look, continuously conveying the successive depending loops through an elongated treatment zone, and concurrently subjecting the successive depending loops to opposed generally horizontal high velocity streams of heated air to increase the temperature of the link food products to at least 150° F.

Preferably, the high velocity streams of heated air have a temperature of at least 300° F. and a velocity of at least 3,000 feet per minute; and the link products are moved through the treatment zone at a rate of at least two feet per minute.

The invention provides link food product treatment methods and apparatus that are compatible with existing equipment such as stuffer-linkers, smokers, chillers or the like; and that provide rapid and uniform thermal processing on a continuous basis.

Other features and advantages will be seen as the following description of a particular embodiment progresses in conjunction with the drawings, in which:

FIG. 3 is a side elevational view (with parts broken away) of the treatment system of FIG. 2;

FIG. 4 is a plan view of the treatment system shown in FIG. 3;

FIG. 5 is a cross sectional view taken along the line 5—5 of FIG. 3;

DESCRIPTION OF PARTICULAR EMBODIMENT

Figure 1:
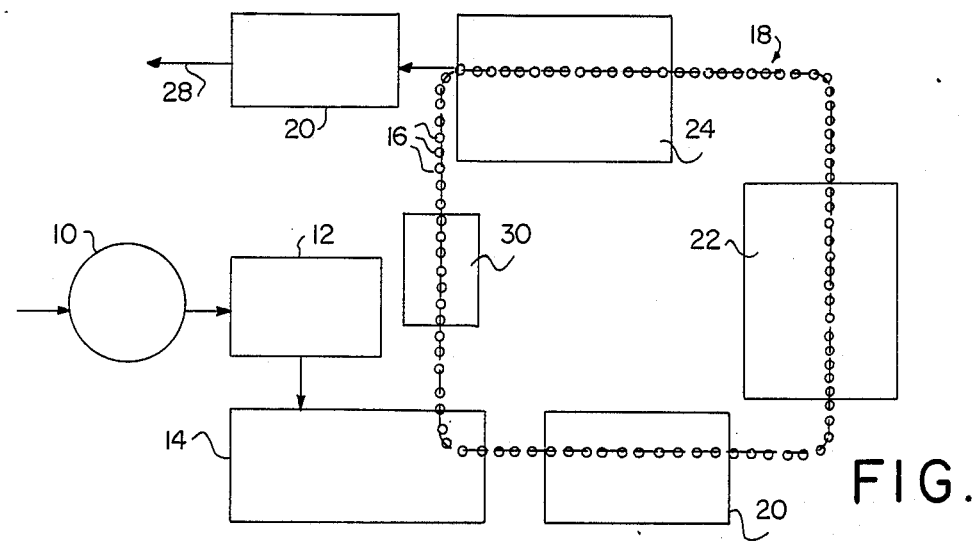
FIG. 1 is a diagram of a frankfurter processing system in accordance with the invention.

The frankfurter processing system diagrammatically shown in FIG. 1 includes emulsifier 10 to which meat products are supplied, emulsified and then pumped by meat pump 12 to stuffer-linker machine 14 where the emulsion is stuffed into an elongated casing and links of uniform length are formed. Successive loops of links are placed on hooks (diagrammatically indicated at 16) of conveyor 18 for transport through smoke unit 20 where the product links are drenched with a liquid smoke material. Conveyor 18 then transports the frankfurters to cooking unit 22 where the frankfurters are subjected to heated high velocity air for cooking in about five minutes. Conveyor 18 then transports the cooked frankfurters to brine chiller 24 which cools the cooked frankfurters and delivers them to peeler unit 26 and then to packaging as indicated at 28. The continuous conveyor chain 18 passes through an ultrasonic cleaning bath 30 before returning to the stuffer linker unit 14 for further loops of frankfurters.

Further details of cooking system 22 may be seen with reference to FIGS. 2-5. Cooking system 22 includes thermally-insulated chamber structure 40 that has an overall length of about forty five feet, a height of about five feet and a width of about five feet and is mounted on supports 42. Disposed above housing 40, and typically above floor 44, is conditioning plenum unit 46 that includes thermally insulated housing 48 on which are mounted two-fifteen horse power motors 50, 52 that are coupled to circulating fans 54 by drive couplings 56. Burner 58 is mounted in housing 48. Extending between conditioning unit 46 and processing chamber 40 are supply duct structures 60, 62, 64 and 66 that communicate with pressure plenums 68, 70 that are on opposite sides of processing chamber 72 along the length thereof. Return duct 74 receives air exhausted from treatment zone 72 for return to conditioning unit 46. Horizontal perforated baffle plates 76 are disposed in each pressure plenum 68, 70 and provide uniform distribution of the hot air throughout the plenums.

Access doors 77 on the side walls of housing 40 provide access to pressure plenums 68, 70 and access door 78 provides access to burner 58. Treatment chamber 72 is disposed between plenums 68, 70 and is defined by stainless steel side walls 80, 82 that have a height of about four feet and are spaced about two feet apart, and trough-shaped bottom wall 84 that includes longitudinally extending drain channel 86.

Further details of the treatment system may be seen with reference to FIGS. 3-5. Projecting inwardly from side wall 80 is an array of stainless steel tubes 90, each of which has a projecting length of about fifteen centimeters and an inner diameter of about three centimeters and an array of similar tubes 92 projects inwardly from side wall 82. Each tube sheet 80, 82 is eleven gage stainless steel and tubes 90, 92 are twenty gage and are headed and welded in place on their tube sheets. The total orifice area of the nozzle tubes 90, 92 is about 2.7 percent of the area of the side walls 80, 82 of the treatment zone. Tubes 90 on sheet 80 are offset vertically and horizontally from the tubes 92 on sheet 82, with the tubes in each row being spaced about twelve centimeters on center and the rows being spaced about seventeen centimeters vertically on center. The tubes in each row are offset about three centimeters from the tubes in the row above it; and the tubes 90 on wall 80 are offset about six centimeters horizontally and about three centimeters vertically from the corresponding tubes 92 on wall 82 so that (as indicated in the diagrammatic views of FIGS. 6 and 7) the jets 94 of hot air from the tubes 90 on tube sheet 80 are offset from the jets 96 from the tubes 92 on sheet 82 and that the loops of link frankfurters 98 supported on conveyor hooks 16 are subjected to twisting or torquing action as the frankfurters 98 are transported through the treatment zone 72.

Figure 6:
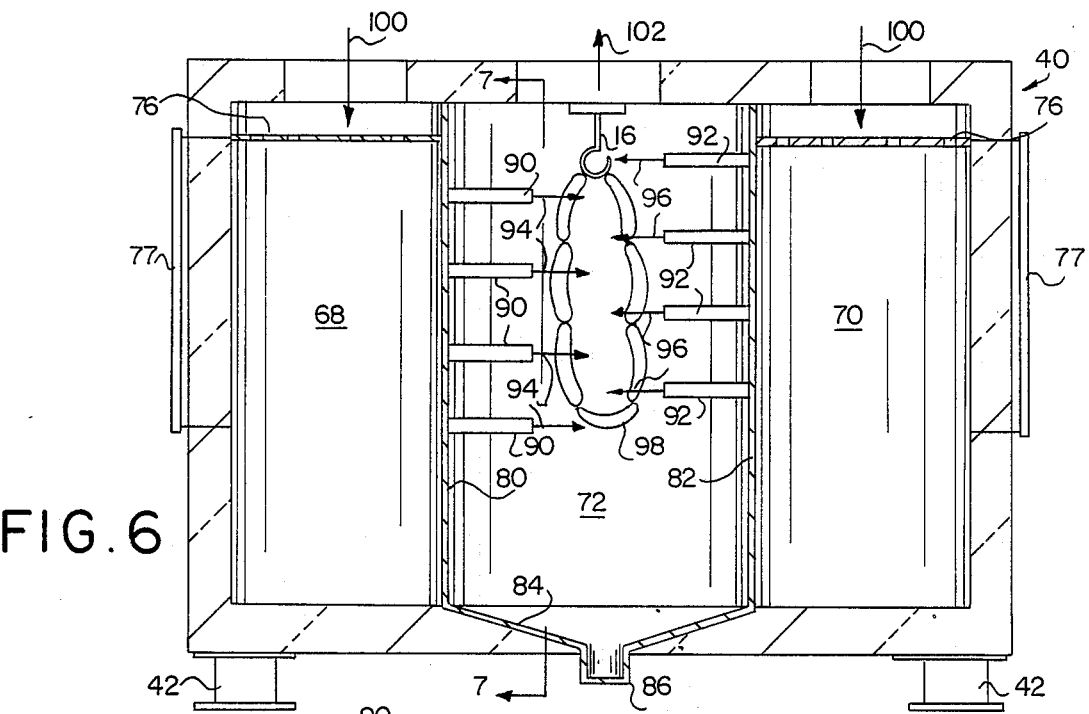
FIG. 6 is a cross-sectional view of the processing chamber of the system shown in FIG. 2.
Figure 7:
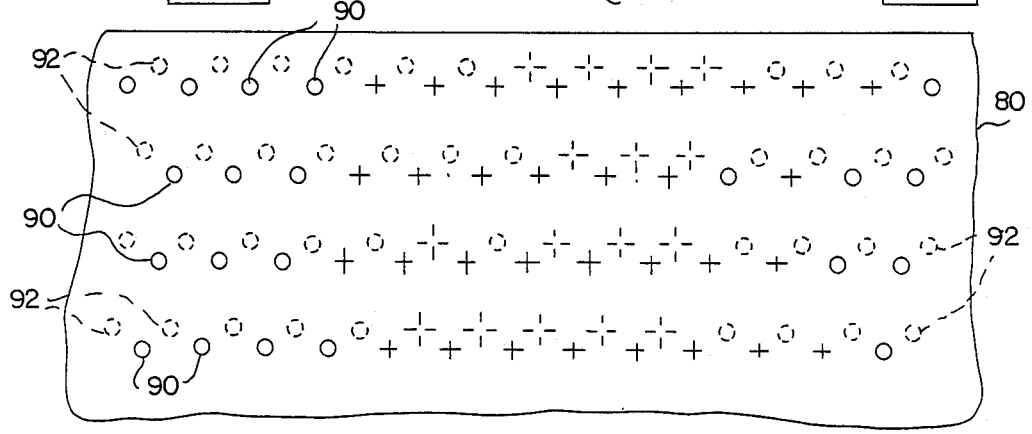
FIG. 7 is a sectional diagrammatic view taken along the line 7—7 of FIG. 6.
Figure 2:
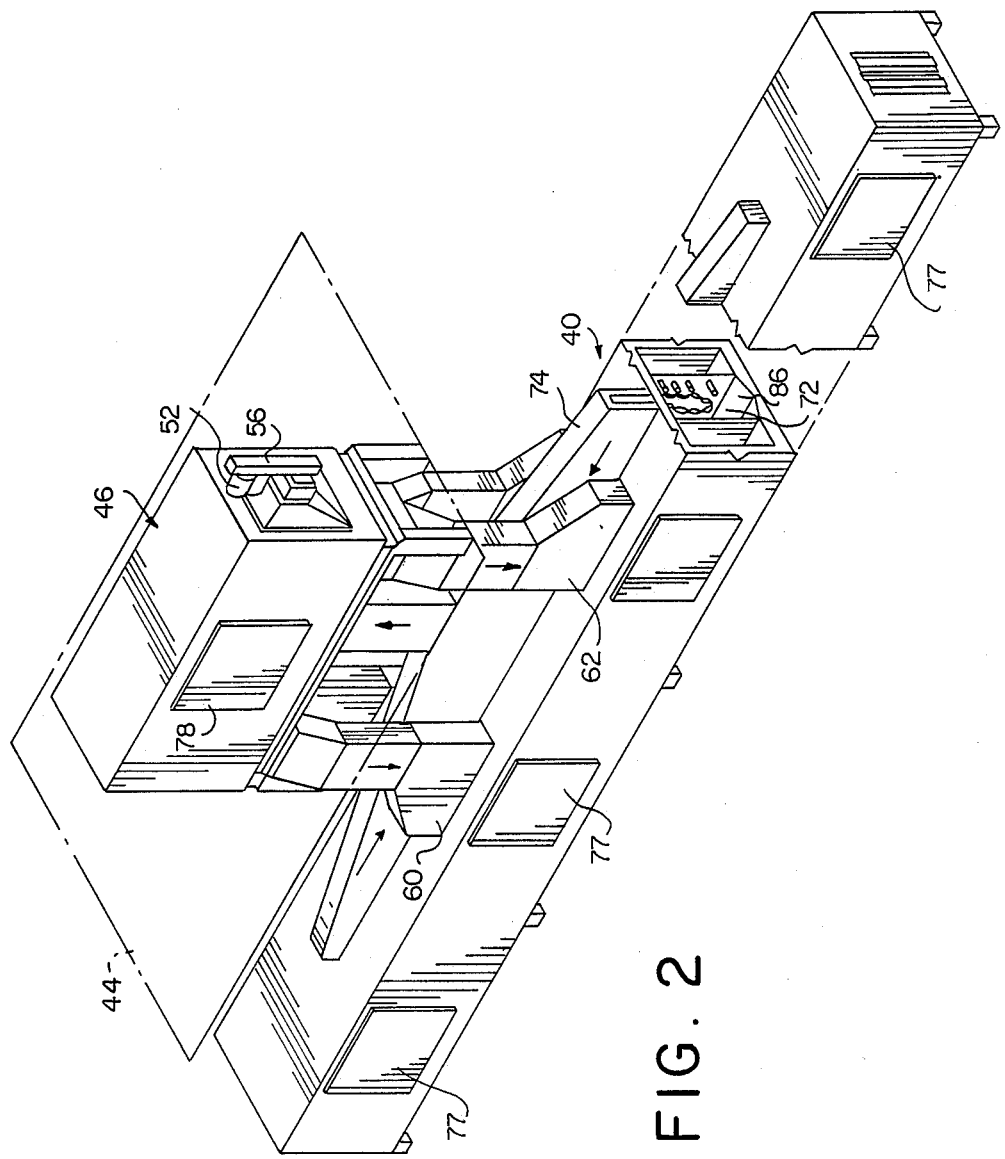
FIG. 2 is a perspective view of a system for thermally treating food products of the link type in accordance with the invention.

In system operation, air heated to a temperature of about 360° F. is circulated from conditioning plenum 46 by blowers 54 through conduits 60-66 to pressure plenums 68, 70 as indicated by arrows 100 in FIG. 6. The pressurized heated air is discharged from plenums 68, 70 through tubes 90, 92 in opposed streams 94, 96 at velocities of about 5,000 feet per minute for impact on the depending loops of frankfurters 98 supported on conveyor hooks 16. Air is exhausted from treatment zone 72 upwardly through duct 74 as indicated by arrow 102. The loops of frankfurters (which extend to a depth of about two feet) are transported to the treatment zone 72 at a rate of about ten feet per minute and the frankfurters 98 attain an internal temperature of about 180° F. Upon exit from treatment zone 72, conveyor 18 transports the frankfurters 98 to brine chiller 24 for cooling.

The interior surfaces of the treatment chamber 72 may be periodically cleaned with a caustic detergent solution that is sprayed into the treatment chamber 72 and drained into channel 86 at the bottom of that chamber.

While a particular embodiment of the invention has been shown and described, various modifications thereof will be apparent to those skilled in the art, and therefore it is not intended that the invention be limited to the disclosed embodiment or to details thereof, and departures may be made therefrom within the spirit and scope of the invention.

What is claimed is:

1. A system for thermally processing a strand of link food products that includes structure defining an elongated treatment zone, hook type conveyor structure for supporting a strand of food product links to be thermally treated in a series of depending loops, each said depending loop containing a plurality of links, for movement along a transport path through said treatment zone, said treatment zone being defined by two parallel spaced pressure plenum structures, each said pressure plenum structure having a vertical side wall and said hook type conveyor structure being disposed between said side walls, each said side wall having an array of generally horizontally extending nozzle tubes that are in communication with its corresponding pressure plenum structure, said array of nozzle tubes being offset from one another so that the link food products are subjected to torquing actions by the offset flows of gas as the link products are transported through said treatment zone by said conveyor structure, conditioning plenum structure coupled to said pressure plenum structures including heater means for heating gas and blower means for flowing gas from said conditioning plenum structure to said pressure plenum structures for flow with substantial velocity through said nozzle tubes in opposed arrays of streams for impact on loops of link food products supported on said conveyor, and exhaust duct structure coupled to said treatment zone for flowing gas from said treatment zone for return to said conditioning plenum structure.

2. The system of claim 1 wherein said gas is flowed through said nozzle tubes into said treatment zone at a temperature of at least 300° F. and a velocity of at least about 3,000 feet per minute.

3. The system of claim 1 wherein said conveyor structure moves the link products to be processed through said treatment zone in less than ten minutes and said link products achieve an internal temperature of at least 150° F. at the exit of said treatment zone.

4. The system of claim 1 wherein each said tube has a length of less than twenty-five centimeters.

5. The system of claim 1 wherein the tips of said tubes of one array are spaced less than one-half meter from the tips of said tubes of the other array.

6. The system of claim 1 wherein each said array has at least three rows of tubes and each row of tubes contains at least twenty tubes.

7. The system of claim 1 wherein the total orifice area of said nozzle tubes is less than five percent of the area of said side walls of said treatment zone.

8. The system of claim 9 wherein each said tube has a length of less than twenty-five centimeters.

9. The system of claim 8 and further including baffle structure in each said pressure plenum structure for providing substantially uniform pressure throughout the length of each said pressure plenum.

10. The system of claim 9 wherein the tips of said tubes of one said array are spaced less than one half meter from the tips of said tubes of the other said array.

11. The system of claim 10 wherein each said array has at least three rows of tubes and each row of tubes contains at least fifty tubes, and each tube has an orifice of about three centimeters diameter and a length of about fifteen centimeters.

12. A system for thermally processing a strand of link food products that includes structure defining an elongated treatment zone,
hook type conveyor structure for supporting a strand of food product links to be thermally treated in a series of depending loops, each said depending loop containing a plurality of links, for movement along a transport path through said treatment zone, said treatment zone being defined by two parallel spaced pressure plenum structures, each said pressure plenum structure having a vertical side wall and said hook type conveyor structure being disposed between said side walls, each said side wall having an array of generally horizontally extending nozzle tubes that are in communication with its corresponding pressure plenum structure,
baffle structure in each said pressure plenum structure for providing substantially uniform pressure throughout the length of each said pressure plenum,
conditioning plenum structure coupled to said pressure plenum structures including heater means for heating gas and blower means for flowing gas from said conditioning plenum structure to said pressure plenum structures for flow with substantial velocity through said nozzle tubes in opposed arrays of streams for impact on loops of link food products supported on said conveyor, and
exhaust duct structure coupled to said treatment zone for flowing gas from said treatment zone for return to said conditioning plenum structure.

13. The system of claim 12 wherein said arrays of nozzle tubes are offset from one another so that the link food products are subjected to torquing actions by the offset flows of gas as the link products are transported through said treatment zone by said conveyor structure.

14. The system of claim 12 wherein said gas if flowed through said nozzle tubes into said treatment zone at a temperature of at least 300° F. and a velocity of at least about 3,000 feet per minute; and said conveyor structure moves the link products to be processed through said treatment zone in less than ten minutes and said link products achieve an internal temperature of at least 150° F. at the exit of said treatment zone.

15. The system of claim 12 wherein each said tube has a length of less than 25 centimeters; the tips of said tubes of one array are spaced less than one half meter from the tips of said tubes of the other array; each said array has at least three rows of tubes; and each row of tubes contains at least twenty tubes.

16. The system of claim 15 wherein said arrays of nozzle tubes are offset from one another so that the link food products are subjected to torquing actions by the offset flows of gas as the link products are transported through said treatment zone by said conveyor structure.

* * * * *